(12) United States Patent
Newberg et al.

(10) Patent No.: US 8,278,793 B2
(45) Date of Patent: Oct. 2, 2012

(54) MOTOR ENDSHIELD

(75) Inventors: Barry M. Newberg, St. Louis, MO (US); Stephen J. Burton, Fenton, MO (US)

(73) Assignee: Nidec Motor Corporation, St. Louis, MO (US)

(*) Notice: Subject to any disclaimer, the term of this patent is extended or adjusted under 35 U.S.C. 154(b) by 308 days.

(21) Appl. No.: 12/618,513

(22) Filed: Nov. 13, 2009

(65) Prior Publication Data

US 2011/0115325 A1    May 19, 2011

(51) Int. Cl.
*H02K 5/00* (2006.01)
(52) U.S. Cl. ............ 310/91; 310/89; 310/400; 310/406; 310/407; 310/410; 248/637
(58) Field of Classification Search .................. 310/89, 310/91, 400, 406, 407, 410; 248/637
See application file for complete search history.

(56) References Cited

U.S. PATENT DOCUMENTS

| | | | |
|---|---|---|---|
| D185,638 S | 7/1959 | Haun, Jr. et al. | |
| 2,966,998 A * | 1/1961 | Schwartz | 220/3.8 |
| D191,706 S | 11/1961 | Jaeschke | |
| D207,401 S | 4/1967 | Andrews et al. | |
| D236,207 S | 8/1975 | Hershberger | |
| 3,990,141 A * | 11/1976 | Stark | 29/596 |
| 4,186,319 A * | 1/1980 | Dochterman | 310/89 |
| 4,236,092 A | 11/1980 | DiFlora | |
| 4,253,634 A * | 3/1981 | Daniels | 248/604 |
| 4,260,125 A * | 4/1981 | Levine | 248/675 |
| D268,022 S | 2/1983 | Lenz et al. | |
| D269,671 S | 7/1983 | Horsting | |
| 4,535,262 A * | 8/1985 | Newberg | 310/88 |
| 4,906,891 A * | 3/1990 | Takagi et al. | 313/318.02 |
| 4,914,331 A * | 4/1990 | Lewis | 310/90 |
| 4,922,151 A * | 5/1990 | Lewis | 310/91 |
| D314,550 S | 2/1991 | Sieber | |
| 5,475,275 A | 12/1995 | Dohogne et al. | |
| 6,809,445 B2 | 10/2004 | Reddy | |
| D526,713 S * | 8/2006 | Shelby et al. | D23/411 |
| D530,278 S | 10/2006 | Lyle et al. | |
| 7,301,253 B2 * | 11/2007 | Tang et al. | 310/91 |
| 2011/0115325 A1* | 5/2011 | Newberg et al. | 310/91 |

OTHER PUBLICATIONS

Line Drawings depicting Prior Art Motor Endshield (on sale at least prior to Nov. 13, 2008).
Solid Surface Drawings depicting Prior Art Motor Endshield (on sale at least prior to Nov. 13, 2008).
Portions of Full Line Standard Motor Catalog from Emerson Motor Company, including pp. i-v, 172, 176, and 181 (Feb. 2008).

* cited by examiner

*Primary Examiner* — John K Kim
(74) *Attorney, Agent, or Firm* — Hovey Williams LLP (57) ABSTRACT

An electric motor assembly is configured to be mounted within a machine in a selected one of multiple possible motor dispositions corresponding with different motor axis positions. The motor assembly includes an endshield having a pair of opposite generally radially-extending mounting flanges. Each mounting flange presents an engagement portion that includes a plurality of spaced apart, dissimilarly-shaped recesses that extend in a generally common direction. The pair of flanges cooperatively present corresponding sets of like-shaped recesses, each of which is associated with one of the motor dispositions, but only one of the sets of recesses extends entirely through the engagement portions to define a single set of like-shaped fastener-receiving through holes corresponding to the selected motor disposition. A method of manufacturing components for electric motor assemblies configured to be mounted within respective machines in a selected one of multiple possible dispositions is also disclosed.

14 Claims, 8 Drawing Sheets

MOTOR ENDSHIELD

CROSS-REFERENCE TO RELATED APPLICATION

This application is being filed contemporaneously with application for U.S. Design patent Ser. No. 29/350,320, entitled MOTOR ENDSHIELD, which is hereby incorporated by reference herein.

BACKGROUND OF THE INVENTION

1. Field of the Invention

The present invention relates generally to an electric motor assembly. More specifically, the present invention concerns an electric motor assembly that includes mounting structure configured to provide a mounting connection between the motor assembly and corresponding structure within a machine into which the motor assembly is to be mounted in a selected one of multiple motor dispositions, each corresponding with different motor axis positions.

2. Discussion of the Prior Art

Those of ordinary skill in the art will appreciate that electric motor assemblies are typically disposed within machines to drive a component or components during operation. There are many different types of machines where such an arrangement is incorporated, and design requirements will often dictate how and where the motor assembly is located within a given machine.

One common arrangement involves the motor assembly being used within a machine to power a driven element, such as through a drive belt. In such a situation, the disposition of the motor assembly within the machine can impact the tension in the belt. The design situation may arise whereby different motor assemblies are to be placed within similar machines, requiring a unique disposition for each exemplary motor assembly. For example, different models of an appliance, such as a washing machine, may selectively include different motor assemblies, with each motor assembly being designed to operate with a corresponding axis position and/or belt tension defined thereby.

Conventionally, the selection of one or another motor assemblies for use in a machine, where each motor assembly requires a different axis position, has required an individual mounting arrangement for each type of motor assembly. Often, a dedicated mounting part, such as a flange, is designed to cooperate with mounting structure within the machine to dispose the motor assembly in such a way that the axis is properly positioned for the desired construction. Traditionally, a unique component including the dedicated mounting part has been designed and manufactured for each individual motor assembly, such that the axis position is proper upon mounting the motor assembly within the machine. This has lead to an abundance of dedicated parts that must be manufactured, inventoried, tracked, and installed for a specific motor assembly design installation.

Even where multiple motor assemblies have been very similar in construction, and may even be designed to be optionally installed in similar machines, attempts to create a common endshield flange have proven difficult. Such common endshields have included multiple mounting holes within the same flange to optionally dispose a motor assembly in a variety of dispositions. These endshields have lead to confusion during assembly as to which set of mounting holes is to be used for a particular application, and have been regarded as aesthetically undesirable, as the unused mounting holes are left exposed and can create an unsightly condition to a customer.

While such conventional endshield mounting systems (dedicated parts or a common part with multiple hole sets) have been satisfactory in some respects, those of ordinary skill in the art will also appreciate that both options present drawbacks in at least cost and convenience. Designing and manufacturing a dedicated endshield with a unique mounting flange for each motor assembly application can require expensive die-casting, machining, stocking, and shipping of a multitude of specialized parts. This specialty process has lead to more part variations in casting databases and increases costs, as multiple dies and machining centers are typically required to provide the dedicated parts.

Similarly, common endshields with multiple mounting hole sets have proven difficult to reliably assemble properly, as a motor assembly that should be secured with one set of mounting holes may easily be improperly secured with an alternate set of mounting holes. Such errors in assembly can lead to significant problems in the situation where a parameter such as belt tension is defined by the disposition of the motor and position of the motor axis within a machine.

SUMMARY

According to an aspect of the present invention, an endshield includes mounting flanges with a plurality of dissimilarly-shaped recesses, each configured to alternately receive a fastener therein. From this inventive construction, multiple endshields can be produced that are substantially similar, but with a selected one of the recesses being punched to a through hole, such that each endshield presents only one set of mounting holes. In this way, the endshields can be secured to different motor assemblies for mounting within respective machines to present predetermined positions for the axis. The dissimilarly-shaped recess options for the single set of mounting holes can assist in providing assembly instructions as to which motor assembly goes into what machine, while providing for the use of fasteners common to both options to be used with either motor assembly.

According to one aspect of the present invention, an electric motor assembly is provided that is configured to be mounted within a machine in a selected one of multiple possible motor dispositions corresponding with different motor axis positions. The electric motor assembly includes a rotor assembly rotatable about the axis and a stator assembly spaced radially from the rotor assembly. The electric motor assembly further includes motor mounting structure that presents at least one engagement portion configured to at least partly engage corresponding machine mounting structure within the machine. The engagement portion includes a plurality of spaced apart, dissimilarly-shaped recesses that extend in a generally common direction and are configured to alternately receive a fastener therein, with each recess being associated with one of the motor dispositions. Only one of the recesses extends entirely through the engagement portion to define a single fastener-receiving through hole corresponding to the selected motor disposition.

According to another aspect of the present invention, an endshield is provided that is configured to least partially cover an axial margin of an electric motor assembly and also configured to provide a mounting connection between the motor assembly and corresponding mounting structure within a machine into which the motor assembly is to be mounted in a selected one of multiple motor dispositions corresponding with different motor axis positions. The endshield includes a body operably secureable to the axial margin of the motor assembly, and the body includes a pair of opposite generally radially-extending mounting flanges. Each mounting flange presents an engagement portion configured to at least partly engage the corresponding mounting structure of the machine. Each engagement portion includes a plurality of spaced apart, dissimilarly-shaped as recesses that extend in a generally common direction and are configured to alternately receive a fastener therein. The pair of flanges cooperatively present corresponding sets of like-shaped recesses, with each of the sets of recesses being associated with one of the motor dispositions. Only one of the sets of recesses extends entirely through the engagement portions to define a single set of like-shaped fastener-receiving through holes corresponding to the selected motor disposition.

Another aspect of the present invention concerns a method of manufacturing components for electric motor assemblies that are configured to be mounted within machines in a selected one of multiple possible motor dispositions corresponding with different motor axis positions. The method includes forming a plurality of endshields configured to be alternately secured to an axial margin of a portion of a selected motor assembly, wherein each of the endshields includes a pair of mounting flanges that each include a plurality of spaced apart, dissimilarly-shaped recesses configured to alternately receive a fastener therein, such that the flanges cooperatively present corresponding sets of like-shaped recesses, each of which is associated with one of the motor dispositions. The forming step includes the step of providing material flashing across each of the recesses. The method further includes removing the material flashing from a first set of like-shaped recesses to produce a first subset of endshields that each present a first set of like-shaped through holes for use with a first subset of motor assemblies, and removing the material flashing from a second set of like-shaped recesses to produce a second subset of endshields that each present a second set of like-shaped through holes for use with a second subset of motor assemblies.

This summary is provided to introduce a selection of concepts in a simplified form that are further described below in the detailed description of the preferred embodiments. This summary is not intended to identify key features or essential features of the claimed subject matter, nor is it intended to be used to limit the scope of the claimed subject matter.

Various other aspects and advantages of the present invention will be apparent from the following detailed description of the preferred embodiments and the accompanying drawing figures.

BRIEF DESCRIPTION OF THE DRAWING FIGURES

A preferred embodiment of the present invention is described in detail below with reference to the attached drawing figures, wherein.

The drawing figures do not limit the present invention to the specific embodiments disclosed and described herein. The drawings are not necessarily to scale, emphasis instead being placed upon clearly illustrating the principles of the preferred embodiments.

DETAILED DESCRIPTION OF THE PREFERRED EMBODIMENTS

The present invention is susceptible of embodiment in many different forms. While the drawings illustrate, and the specification describes, certain preferred embodiments of the invention, it is to be understood that such disclosure is by way of example only. There is no intent to limit the principles of the present invention to the particular disclosed embodiments.

Figure 1:
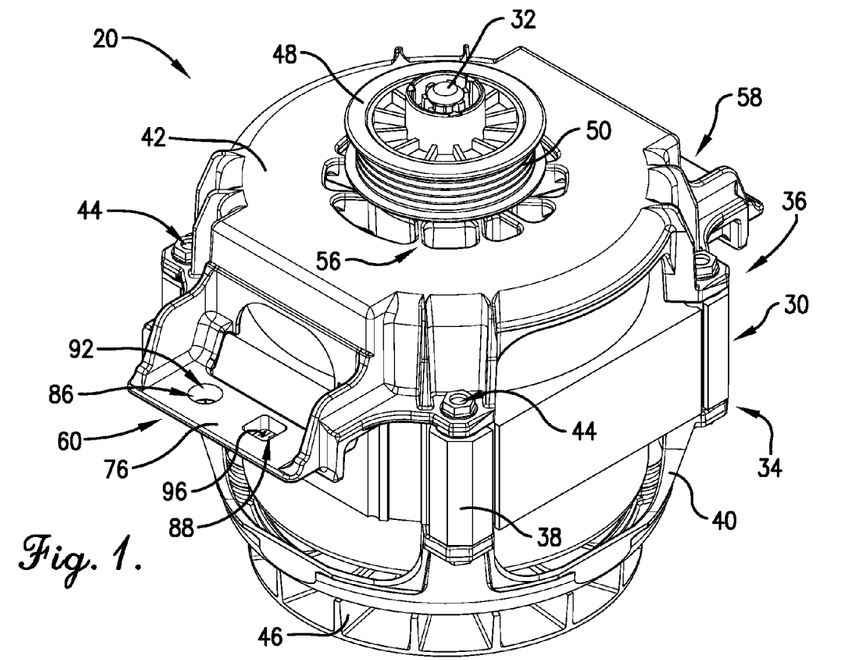
FIG. 1 is a generally upside-down isometric view of an electric motor assembly constructed in accordance with the principles of a preferred embodiment of the present invention, depicting one end of the motor assembly that includes an endshield with a shaft of the assembly protruding therefrom and a sheave disposed on the shaft, with the endshield including opposite mounting flanges, each presenting a pair of dissimilarly-shaped recesses, one of which extends through the flange to define a hole.
Figure 2:
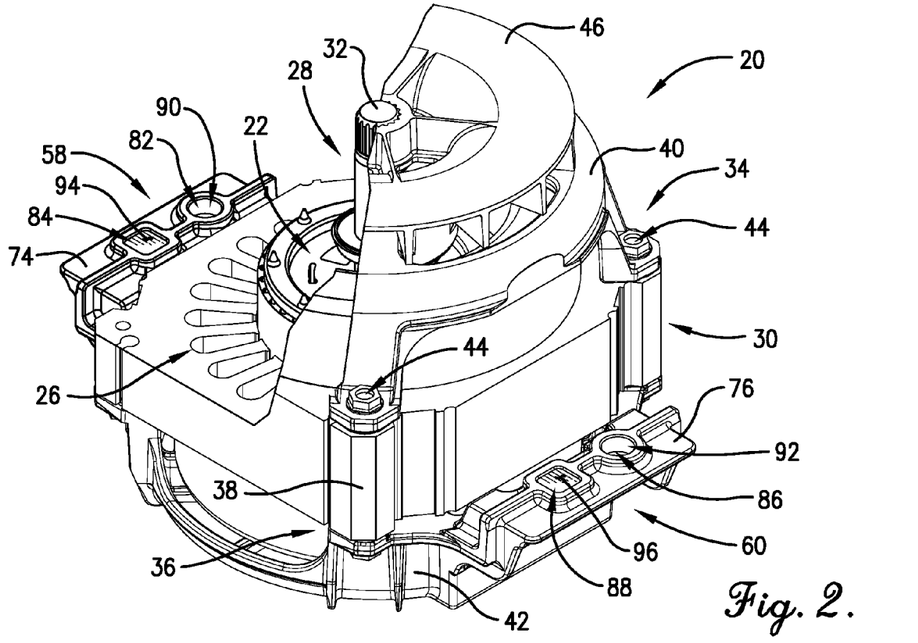
FIG. 2 is a generally right-side-up partial cutaway isometric view of the electric motor assembly of FIG. 1, shown from another vantage point, depicting another end of the motor assembly that includes an endshield and depicting internal components of the motor assembly.

With initial reference to FIGS. 1 and 2, an electric motor assembly 20 constructed in accordance with a preferred embodiment of the present invention is depicted for use in various applications. While the motor assembly 20 is useful in various applications, the illustrated embodiment has particular utility when the motor assembly 20 is configured to be mounted within a machine (not shown), such as a washing machine, in a selected one of multiple possible motor assembly dispositions, each corresponding with a different motor axis position, as described in detail below.

As is customary, the motor assembly 20 broadly includes a rotor assembly 22, which is rotatable about an axis 24, and a stator assembly 26. The rotor assembly 22 and at least a radially inner portion of the stator assembly 26 are both contained within an internal motor chamber 28 that is broadly defined by a radially outer portion 30 of the stator assembly 26. In the illustrated embodiment, the rotor assembly 22 includes an axially-disposed shaft 32 that projects outwardly from both ends of the stator assembly 26. As will be appreciated, these general components of the motor assembly may be varied significantly from the illustrated embodiment without departing from the scope of the present invention.

The illustrated motor assembly 20 does not include a traditional separate shell or case enclosing the rotor and stator assemblies 22 and 26. Rather, the stator assembly 26 itself presents the radially outer portion 30 that defines a radially outermost sidewall 38 of the motor assembly 20 and presents opposite axial margins 34, 36. In other words, the illustrated embodiment constitutes a "shell-less" motor assembly, as will be understood by one of ordinary skill in the art. While a shell-less motor assembly is illustrated in detail, it is noted that a separate shell element (not shown) may be included in an alternative embodiment without departing from the teachings of the present invention. The radially outermost sidewall 38 is non-vented (i.e., does not include vent holes therein) in the illustrated embodiment. It will be appreciated by one of ordinary skill in the art, however, that the alternative use of a vented sidewall (not shown) or a separate shell element (not shown), including either a vented or non-vented shell element, is clearly within the ambit of the present invention.

The depicted motor assembly 20 further comprises endshields 40, 42 disposed adjacent the axial side margins 34, 36, respectively, and secured to the radially outer portion 30. In the illustrated embodiment, each endshield 40, 42 is secured to the portion 30 with a plurality of fasteners comprising bolt-and-nut assemblies 44. It will be readily appreciated by one of ordinary skill in the art, however, that either or both of the endshields 40, 42 could alternatively be secured to the portion 30, such as by welding or being integrally formed therewith, without departing from the teachings of the present invention. It is further noted that an alternative motor assembly need not include separate endshields to remain within the ambit of the present invention, as described below.

The motor assembly 20 of the illustrated embodiment further includes a rotatable fan element 46 fixed about the shaft 32 and located adjacent the endshield 40 positioned at the top of the motor assembly 20. It is noted that any references made herein to relative directions (e.g., top or bottom) are made with respect to an exemplary disposition illustrated in the drawing figures as presented, and are included for convenience only; it being understood that the depicted motor assembly 20 could alternatively be displaced in other directions without departing from the teachings of the present invention. The fan element 46 is carried on the shaft 32 and configured for rotation therewith, with the fan element 46 being secured to the shaft 32 by way of a splined interface (as illustrated) or other suitable connection, as will be readily appreciated by one of ordinary skill in the art upon review of this disclosure.

The motor assembly 20 of the illustrated embodiment also includes a rotatable sheave 48 fixed about the shaft 32 and located adjacent the endshield 42 positioned at the bottom of the motor assembly 20. The sheave 48 is carried on the shaft 32 and configured for rotation therewith, with the sheave 48 being secured to the shaft 32 by way of a splined interface (as illustrated) or by other suitable connection, as will be readily appreciated by one of ordinary skill in the art upon review of this disclosure.

The sheave 48 of the illustrated embodiment presents a radially outer periphery 50 that is configured to receive a drive element, such as a belt (not shown), therearound. For purposes of the embodiment depicted, it is supposed that the motor assembly 20 is to be used within a machine (not shown) to power a driven element (not shown) through the drive belt. As will be readily appreciated by one of ordinary skill in the art, in such a situation, the disposition of the motor assembly 20 within the machine can impact the tension in the belt. The motor assembly 20 of the present invention is configured to be mounted in a machine in a selected one of multiple possible motor dispositions corresponding with different motor axis 24 positions to provide proper belt tension in a designed construction.

It is noted that, as will be readily understood by one of ordinary skill in the art upon review of this disclosure, the multiple possible motor dispositions, each corresponding with a different motor axis 24 position, may further include dispositions unrelated to belt tension. For example, the motor assembly 20 may be mounted within a machine in various motor dispositions where the position of the motor axis 24 may be changed, not only axially laterally, but also axially longitudinally, and/or even rotationally or angularly relative to other possible motor dispositions. Such alternative and/or compound differences in motor axis 24 positions are contemplated under the broad description of different motor axis 24 positions used throughout this disclosure, and remain within the ambit of the present invention.

With continued reference to FIGS. 1 and 2, and with attention also to FIGS. 5 and 6, additional structural details of the endshields 40, 42 will be described. Initially, it is noted that the top endshield 40 disposed adjacent the top axial margin 34 is conventional in many respects and will not be described in detail herein, as the construction and function of the top endshield 40 should be readily apparent to one of ordinary skill in the art upon review of this disclosure. The bottom endshield 42 disposed adjacent the bottom axial margin 36 will now be described in additional detail, with it being again noted that the relative terminology of "bottom" in reference to the endshield 42 is for convenience only with respect to the drawing figures. For example, the endshield 42 could alternately be disposed adjacent the other axial margin 34 (or both margins 34, 36, or even both margins more abstractly, as the motor assembly 20 need not be vertically disposed) without departing from the teachings of the present invention.

The endshield 42 broadly includes a body 52 defining a centrally-disposed axial hole 54 and a plurality of vent openings 56 defined therethrough, and motor mounting structure in the form of a pair of opposite generally radially-extending mounting flanges 58, 60. The axial hole 54 permits the shaft 32 to extend therethrough and is at least partly defined by an inner core 62 that maybe configured for receiving a bearing (not shown), as will be appreciated by one of ordinary skill in the art. Modifications to the endshield 42, such as providing an alternative closed-end endshield (without an axial hole or shaft extending therethrough), may be incorporated without departing from the teachings of the present invention.

The plurality of vent openings 56 are defined by a grate pattern on the endshield 42 to permit vent air to flow in a generally axial direction through the motor chamber 28 to cool the motor assembly 20 from heat generated during operation. As will be readily appreciated by one of ordinary skill in the art upon review of this disclosure, the fan element 46, which may rotate with the rotor assembly 22, may be used to pull cooling vent air through the vent openings 56, into the chamber 28, and push the air out of corresponding vent openings (not shown) in the opposite endshield 40 to provide a cooling effect to the motor assembly 20. Of course, alternative cooling and/or venting arrangements, including a motor having a vented margin or shell (not shown) or a totally enclosed motor having endshields without any vent openings (not shown), are contemplated and are clearly within the ambit of the present invention.

The body 52 of the endshield 42 also includes a plurality of assembly flanges 64 approximately equidistantly spaced around a circumference of the body 52. Each of the assembly flanges 64 extends generally radially outwardly from a central portion of the body 52 and includes a central assembly hole 65 extending axially therethrough. Each assembly hole 65 receives one of the fasteners 44 to facilitate assembly of the endshield 42 to the radially outer portion 30 of the stator assembly 26 in a manner generally known in the art.

With particular attention to FIGS. 5 and 6, additional structural details of the mounting flanges 58, 60 will be described. Each mounting flange 58, 60 broadly includes a pair of generally radially-projecting extension arms 66, 68 and 70, 72, respectively, and an engagement portion 74, 76 extending between outer margins of the extension arms 66, 68 and 70, 72. The engagement portion 74, 76 of each flange 58, 60 is configured to at least partly engage corresponding mounting structure 78, 80 (see FIG. 4) within the machine into which the motor assembly 20 is to be mounted. In the illustrated embodiment, the body 52 of the endshield 42 includes two mounting flanges 58, 60, although it is noted that the endshield 42 may alternatively present more than two engagement portions without departing from the teachings of the present invention.

It is further noted that while the motor mounting structure of the illustrated embodiment comprises endshield mounting flanges, alternative embodiments of motor mounting structure (not shown) having the inventive machine attachment arrangement are encompassed within the principles of the present invention. Such alternative motor mounting structure need not take the form of endshield mounting flanges at all, but may nevertheless present at least one engagement portion configured to at least partly engage corresponding machine mounting structure. For example, alternative motor mounting structure may protrude directly from a stator assembly or other part of an alternative motor case while remaining within the ambit of the present invention, as will be readily appreciated by one of ordinary skill in the art upon review of this disclosure.

Each of the illustrated engagement portions 74, 76 is generally planar and extends primarily in a direction substantially orthogonal to the axis 24 of the motor assembly 20. While the generally planar engagement portions 74, 76 are shaped to correspondingly engage the generally planar exemplary mounting structure 78, 80 as depicted, alternative shapes for such engagement portions (such as curved portions) may be incorporated as desired to correspond with alternative mounting structure within a machine, with such alternative engagement portions remaining fully within the ambit of the present invention.

Each engagement portion 74, 76 includes a plurality of spaced apart, dissimilarly-shaped receiving recesses 82, 84 and 86, 88, respectively. The recesses 82, 84, 86, 88 all extend in a generally common direction (preferably in the axial direction as depicted). As shown in the drawings, while each individual flange 58, 60 presents a plurality of dissimilarly-shaped recesses 82, 84 and 86, 88, the pair of flanges 58, 60 cooperatively presents corresponding sets of like-shaped recesses 82, 86 and 84, 88. Each of the sets of like-shaped recesses 82, 86 and 84, 88 is associated with one of the possible motor dispositions within a machine, with each motor disposition corresponding to a different disposition of the motor axis 24 as described in detail below.

In the illustrated embodiment, each individual flange 58, 60 presents only one pair of dissimilarly-shaped recesses, wherein the recesses 82 and 86 are circular in shape and the recesses 84 and 88 are noncircular in shape (square-shaped as depicted). It is noted that the shapes depicted in the drawing figures are exemplary only, as alternatively-shaped recesses (not shown) may be incorporated and would, of course, remain within the ambit of the present invention.

Moreover, while each of the depicted engagement portions 74, 76 includes two dissimilarly-shaped recesses (82 and 84 on engagement portion 74, and 86 and 88 on engagement portion 76), it is noted that additional recesses could alternatively be included without departing from the teachings of the present invention, so long as the plurality of such alternative engagement portions cooperatively present corresponding sets of like-shaped recesses. In this way, corresponding sets of like-shaped recesses (whether two or more) are easily identifiable during assembly, as will be described in more detail below.

Figure 7:
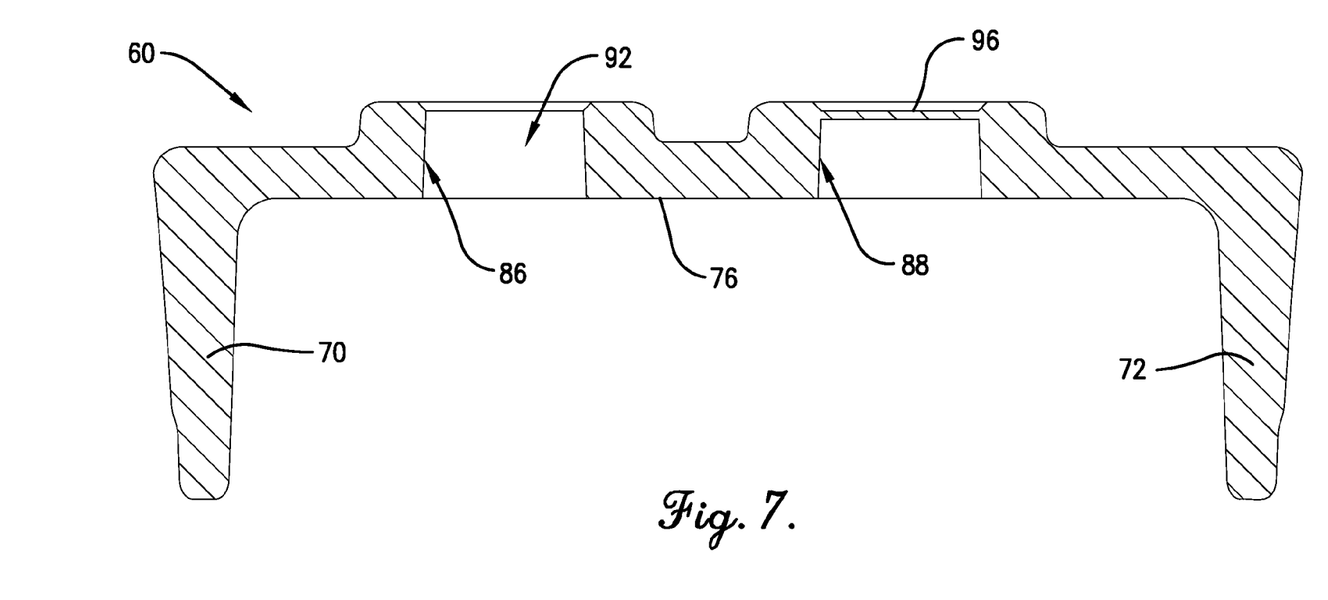
FIG. 7 is an enlarged, side sectional view of a portion of one of the mounting flanges, taken along the line 7-7 of FIG. 4, depicting in detail the pair of dissimilarly-shaped recesses, the circular one of which extends through the flange to define a through hole, and the noncircular one of which remains closed with material flashing.
Figure 7A:
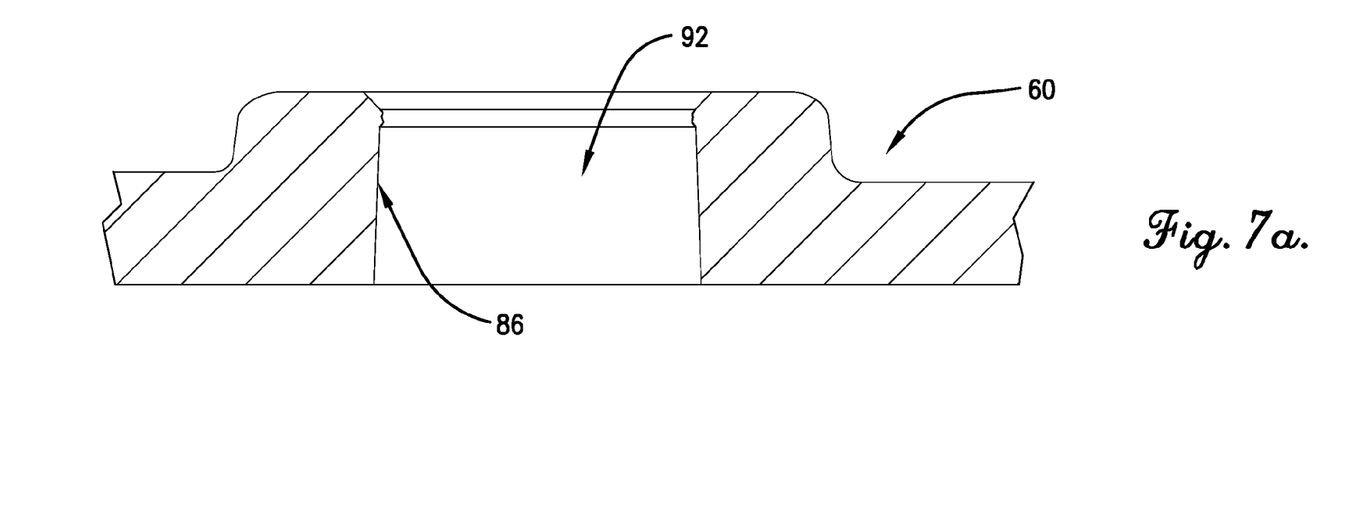
FIG. 7a is an enlarged, fragmentary, side sectional view of the portion of the mounting flange of FIG. 7, depicting in detail the single through hole of the flange.
Figure 8:
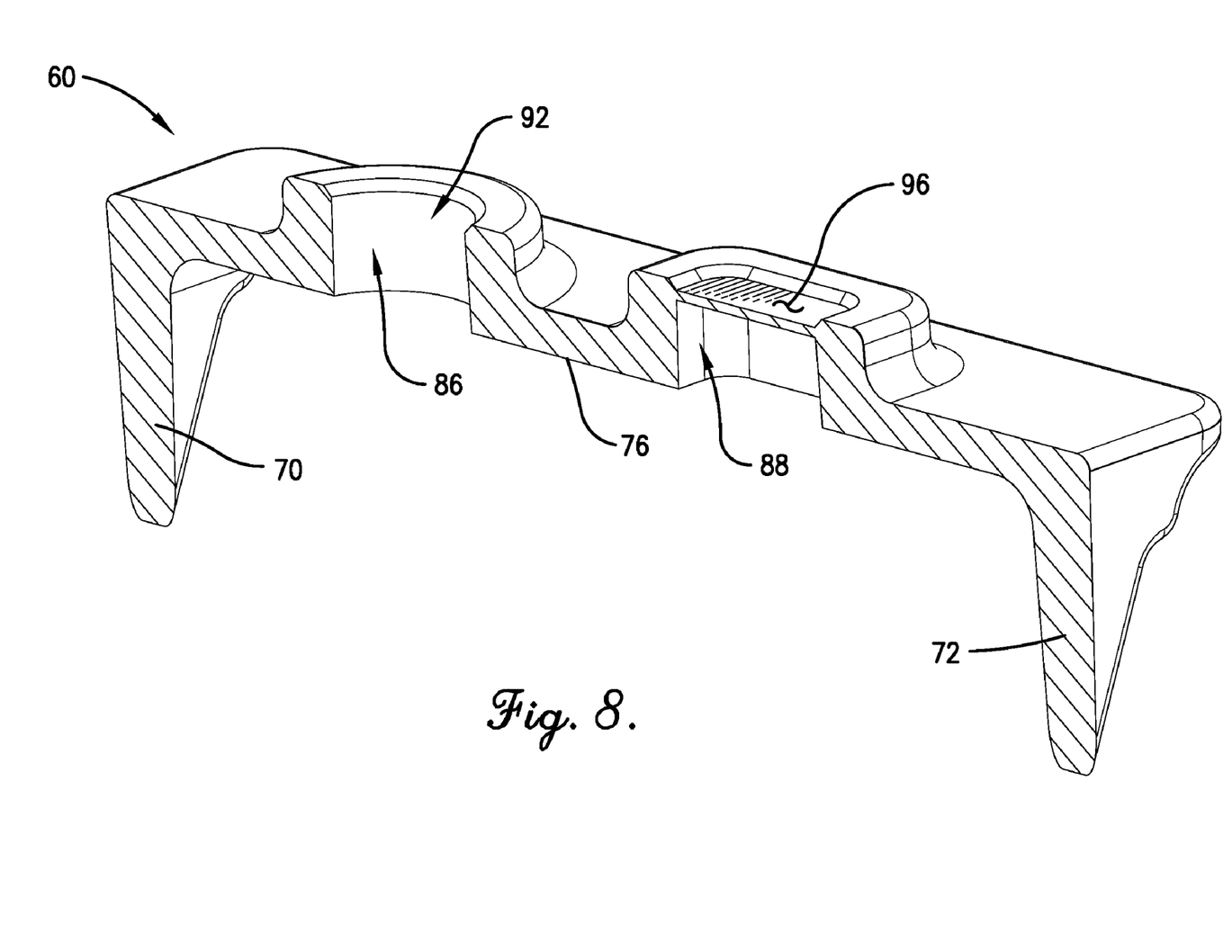
FIG. 8 is an isometric view of the portion of one of the mounting flanges shown in FIG. 7, depicting in detail the pair of dissimilarly-shaped recesses, the circular one of which extends through the flange to define a through hole, and the noncircular one of which remains closed with material flashing.
Figure 9:
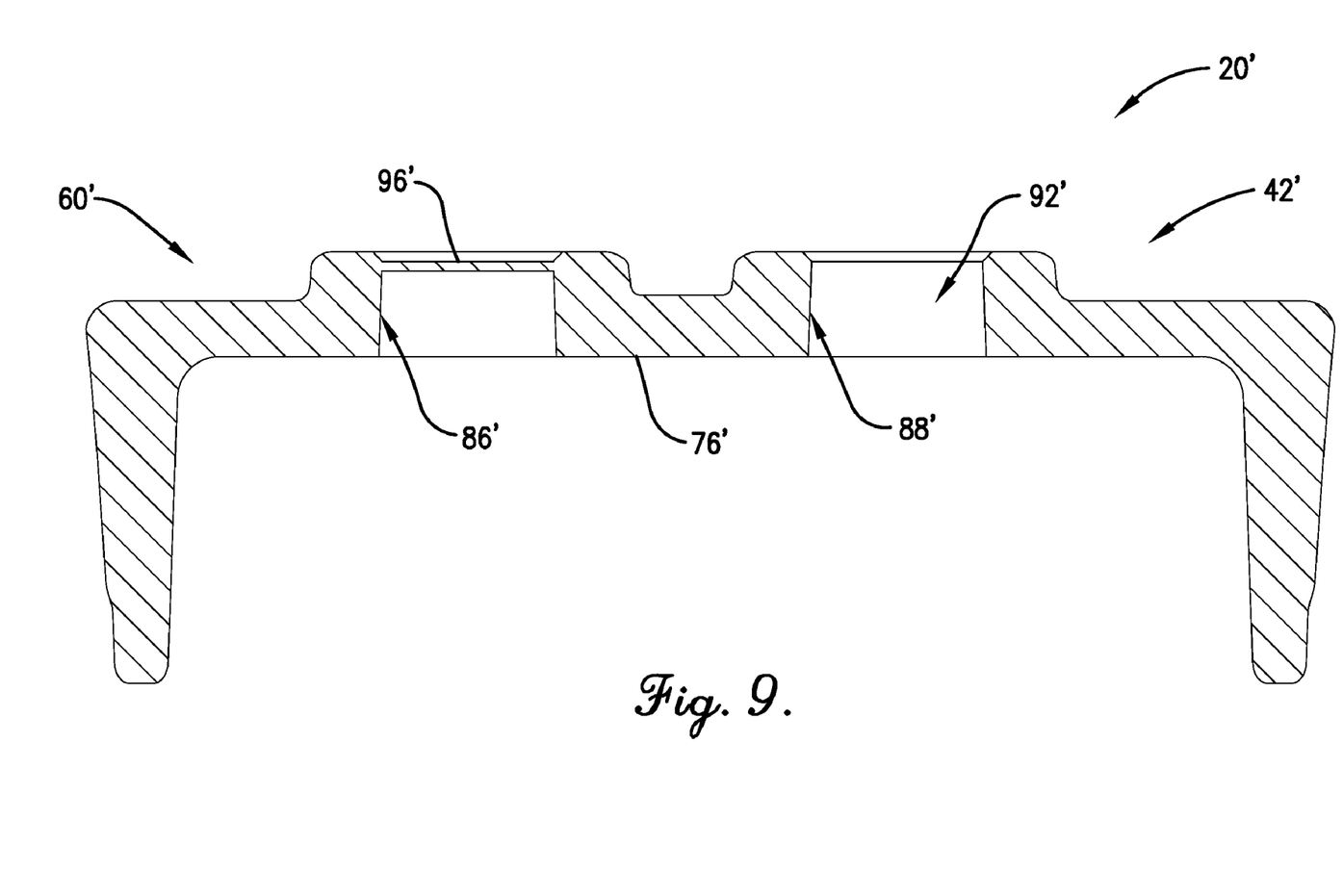
FIG. 9 is an enlarged, side sectional view of a portion of one of the mounting flanges as provided in an alternative preferred embodiment, depicting in detail the pair of dissimilarly-shaped recesses, the noncircular one of which extends through the flange to define a through hole, and the circular one of which remains closed with material flashing.
Figure 10:
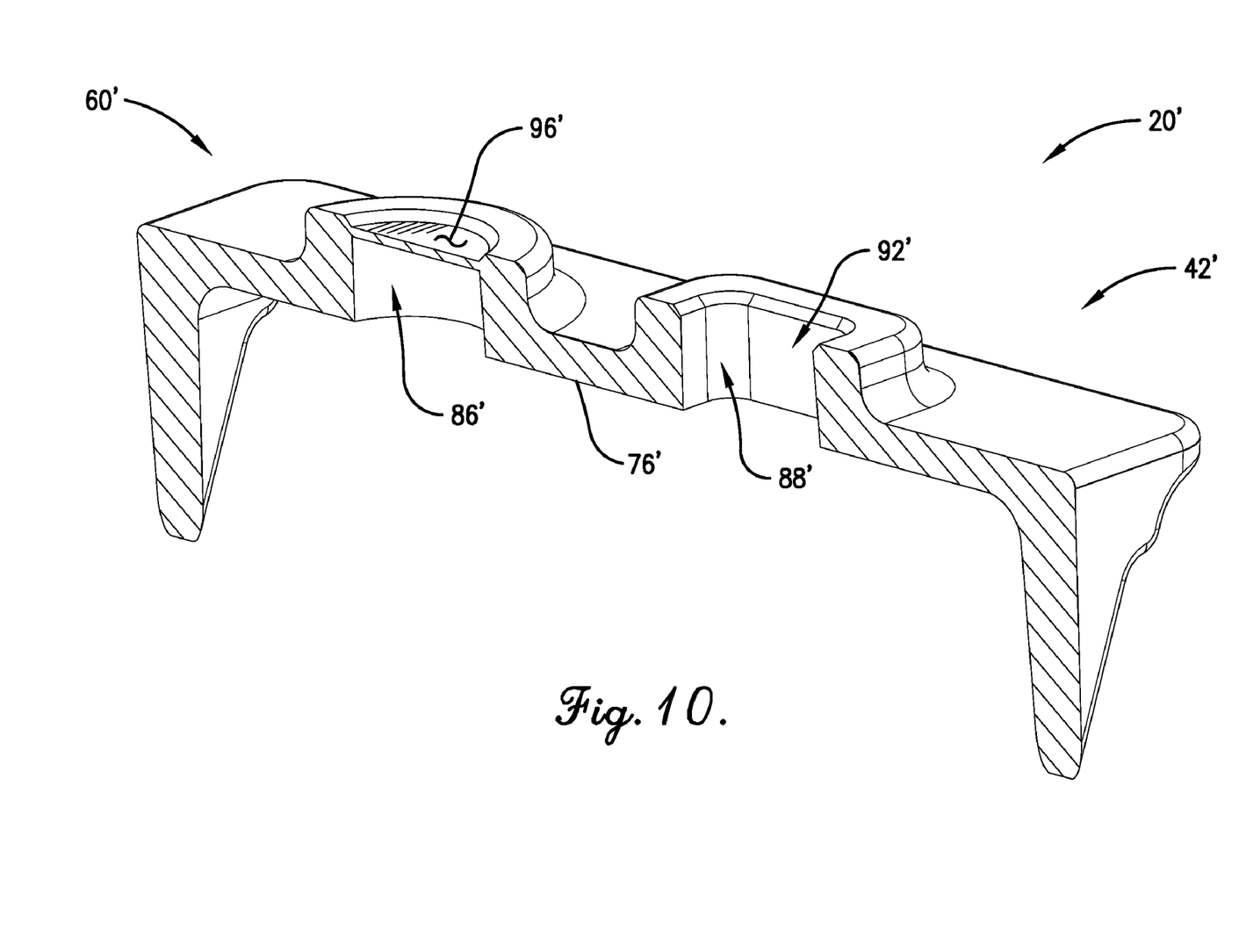
FIG. 10 is an isometric view of the portion of the mounting flange shown in FIG. 9, depicting in detail the pair of dissimilarly-shaped recesses, the noncircular one of which extends through the flange to define a through hole, and the circular one of which remains closed with material flashing.

Regardless of the number of corresponding sets of like-shaped recesses 82, 86 and 84, 88 (whether two or more), only one of the sets of recesses (circular-shaped recesses 82, 86 as depicted in FIGS. 1-8 or noncircular-shaped recesses 84', 88' as depicted in FIGS. 9-10) extend entirely through the engagement portions 74, 76 to define a single set of like-shaped through holes 90, 92 that correspond to the selected motor disposition. In other words, in the illustrated embodiment of FIGS. 1-8, the circular-shaped recesses 82, 86 also comprise the through holes 90, 92; whereas the noncircular-shaped recesses 84, 88 instead include a material flashing 94, 96 extending thereacross. In contrast, in the illustrated embodiment of FIGS. 9-10, the noncircular-shaped recesses 84', 88' also comprise the through holes 90', 92'; whereas the circular-shaped recesses 82', 86' instead include a material flashing 94', 96' extending thereacross.

With particular attention to the enlarged FIGS. 7, 7a, and 8, it can be easily seen that although the engagement portion 76 of the flange 60 includes both axially-extending recesses 86, 88, only the circular recess 86 extends entirely therethrough to present the hole 92. The noncircular recess 88, on the other hand, remains sealed with a material flashing 96 extending thereacross, preventing any fastener from passing therethrough. As shown in FIGS. 9 and 10, an alternative endshield 42' can be easily formed wherein the noncircular recess 88' extends through the engagement portion 76' to present an alternative hole 92', while the circular recess 86' remains sealed with a material flashing 96'. With quick reference to FIG. 3, it will be readily apparent to one of ordinary skill in the art that such an alternative endshield 42' would serve to locate the motor assembly 20' in a laterally offset disposition relative to that provided by the endshield 42 depicted in FIGS. 1-8.

Figure 4:
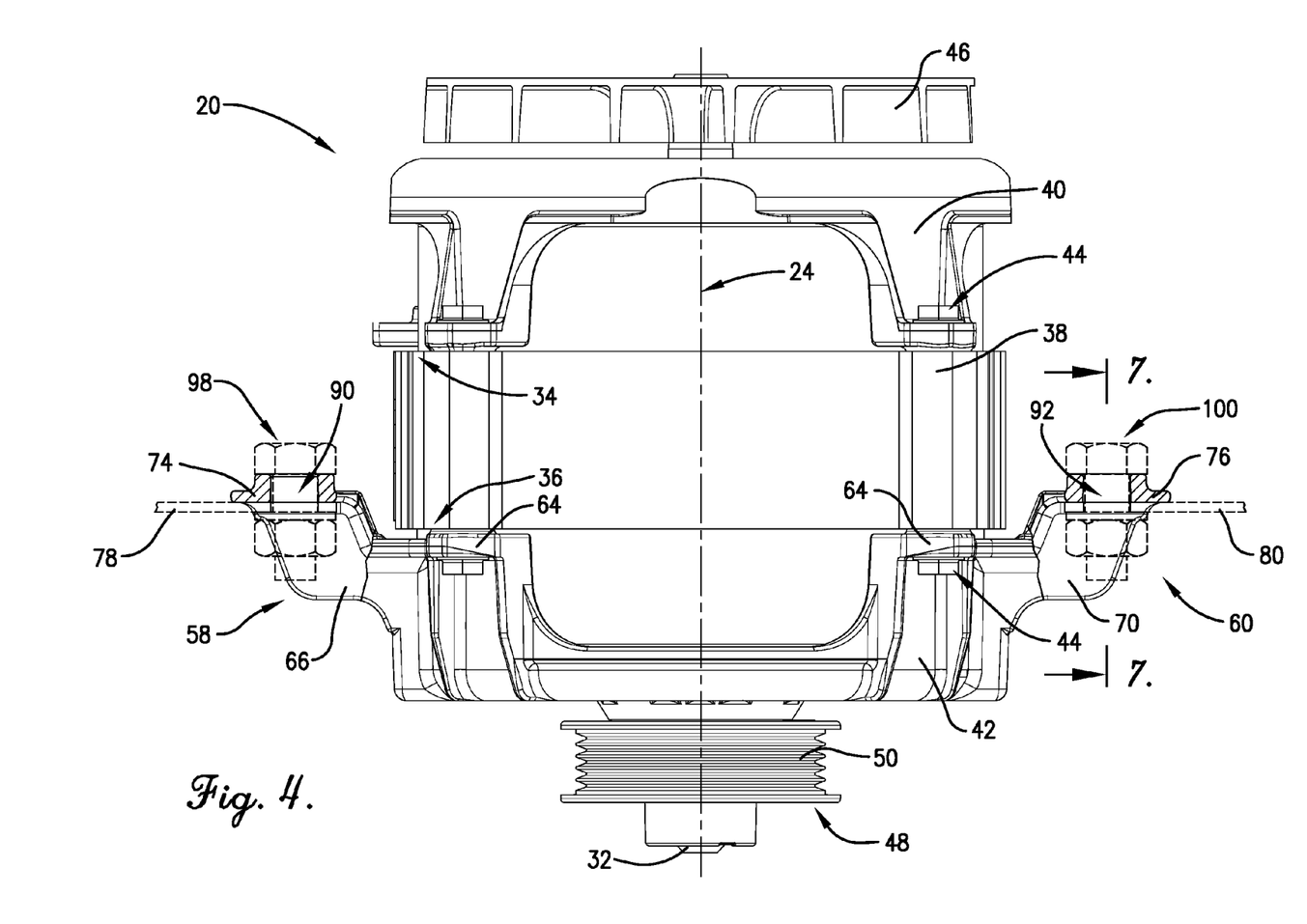
FIG. 4 is side elevational view of the electric motor assembly of FIG. 1, particularly depicting the motor assembly being secured to exemplary mounting structure of a machine into which the motor assembly may be mounted, with the mounting structure and fasteners that pass through the mounting structure and through the mounting flanges being shown in broken lines.

With reference now to FIG. 4, and with continued attention to the enlarged FIGS. 7-8, it will be readily understood by one of ordinary skill in the art that the motor assembly 20 may be secured to corresponding mounting structure 78, 80 within a machine by the passage of fasteners (such as the exemplary bolt-and-nut assemblies 98, 100). These fasteners 98, 100 pass through the holes 90, 92 of the engagement portions 74, 76 of the flanges 58, 60 and also through the corresponding mounting structure 78, 80. With continued reference to FIG. 4, it can also be seen that the assembly flanges 64 are axially offset from the mounting flanges 58, 60.

As shown somewhat schematically in FIGS. 7-10, dissimilarly-shaped recesses 86, 88 or 86', 88' of the flange 60 or 60' each present a substantially equal minimum distance dimension thereacross. In this way, the same fastener (such as bolt-and-nut assembly 100) may be used to secure either embodiment of the endshield to corresponding mounting structure 80, as will be readily appreciated by one of ordinary skill in the art upon review of this disclosure.

Figure 3:
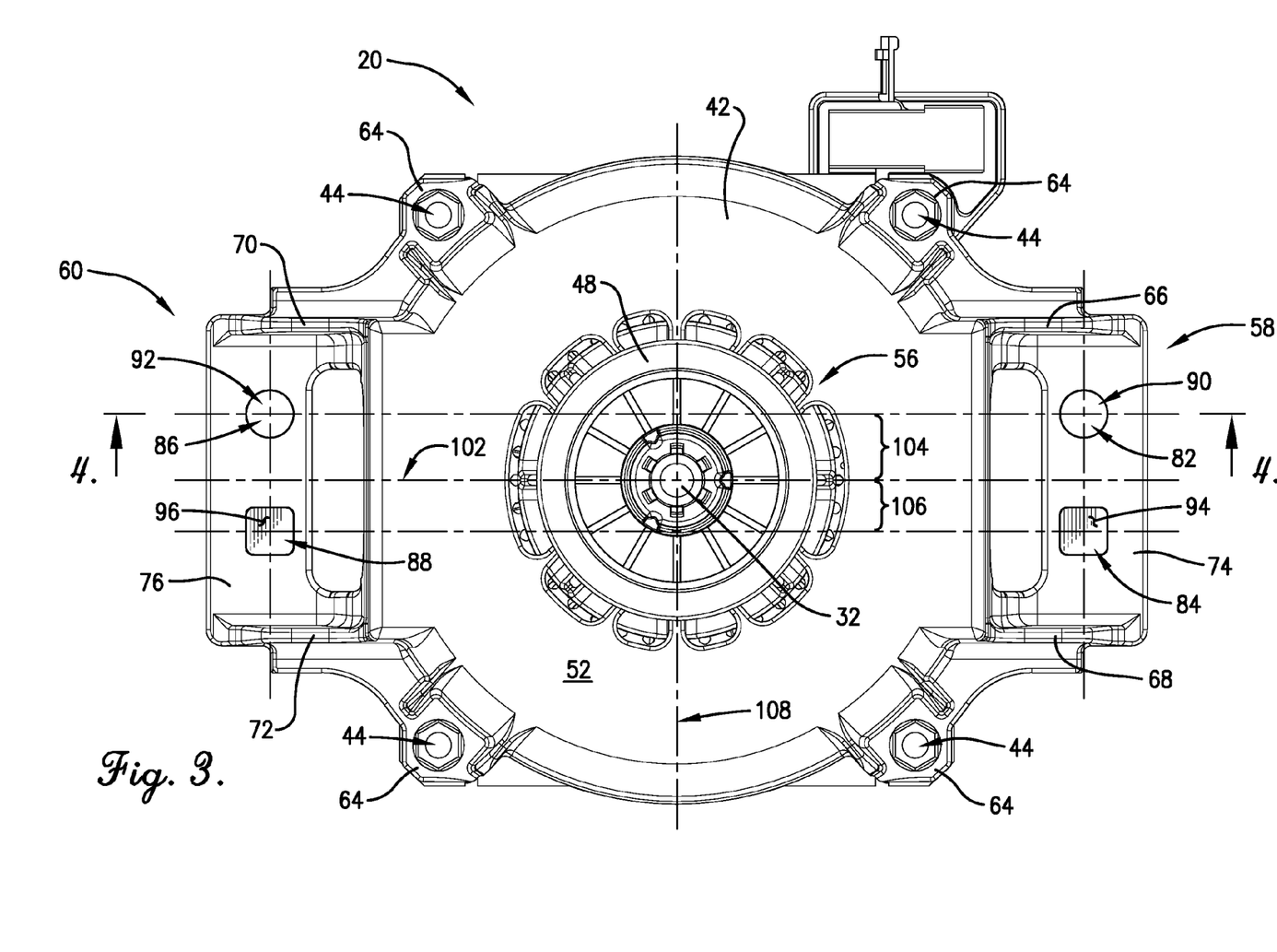
FIG. 3 is bottom-up plan view of the electric motor assembly of FIG. 1, particularly depicting the opposite mounting flanges of the endshield and illustrating a center line of the assembly passing through an approximate midpoint of each flange, with the recesses being laterally offset from the center line.

Turning briefly again to FIG. 3, the endshield 42 defines a radially-extending center line 102 that is aligned with the motor axis 24 and passes through an approximate midpoint of each of the engagement portions 74, 76 of the mounting flanges 58, 60. One of the sets of like-shaped recesses 82, 86 is at least substantially disposed on one side of the center line 102, and the other one of the sets of like-shaped recesses 84, 88 is at least substantially disposed on the other side of the center line 102. In more detail, the circular-shaped set of recesses 82, 86 is laterally disposed a first distance 104 from the center line 102, and the noncircular-shaped set of recesses 84, 88 is laterally disposed a second distance 106 from the center line 102. As can be seen in FIG. 3, the first distance 104 and the second distance 106 are different, thereby offsetting the pairs of recesses 82, 86 and 84, 88 from the center line 102.

As may be appreciated perhaps most clearly from the depiction in FIG. 3, the offsetting of the pairs of recesses 82, 86 and 84, 88 from the center line 102 provides multiple possible motor dispositions corresponding with different motor axis 24 positions, depending upon whether the motor assembly 28 is secured to corresponding mounting structure 78, 80 using holes 90, 92 that are defined by the set of circular-shaped recesses 82, 86 (as depicted in FIGS. 1-8) or using alternative holes 90', 92' that are defined by the set of noncircular-shaped recesses 84', 88' (as depicted in FIGS. 9-10). Due to the lateral offset between dissimilarly-shaped recesses 82, 84 and 86, 88 relative to the center line 102, the use of the alternative mounting arrangements provided by the plurality of recesses 82, 84, 86, 88 correspondingly provides distinct motor axis 24 positions relative to a common disposition of fasteners 98, 100 associated with mounting structure 78, 80 of the machine.

Figure 5:
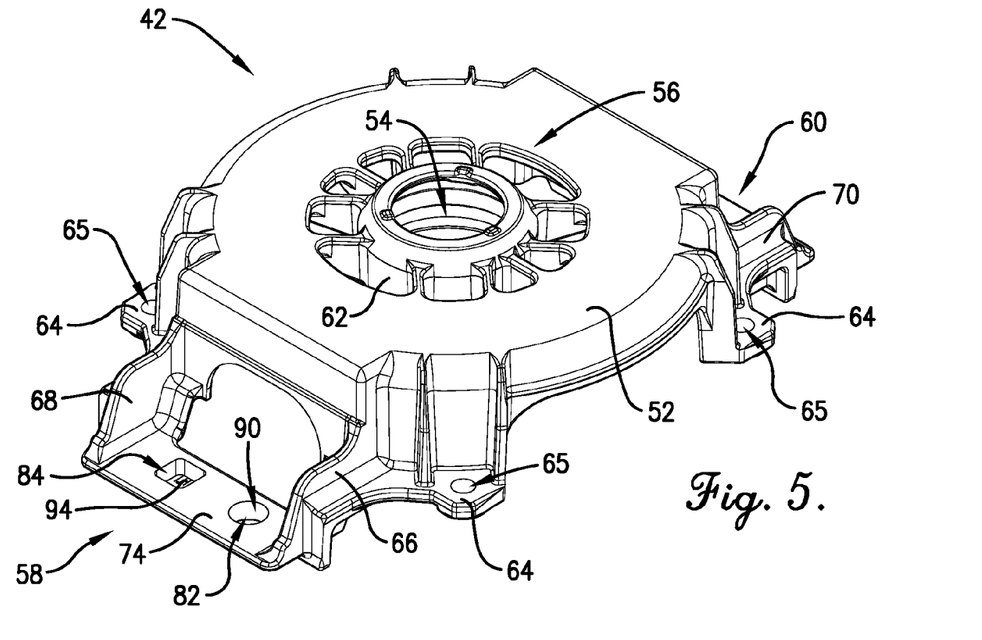
FIG. 5 is an isometric view of the endshield of FIG. 1, particularly depicting structural details thereof and illustrating one of the pair of mounting flanges presenting the pair of dissimilarly-shaped recesses, one of which extends through the flange to define a hole.
Figure 6:
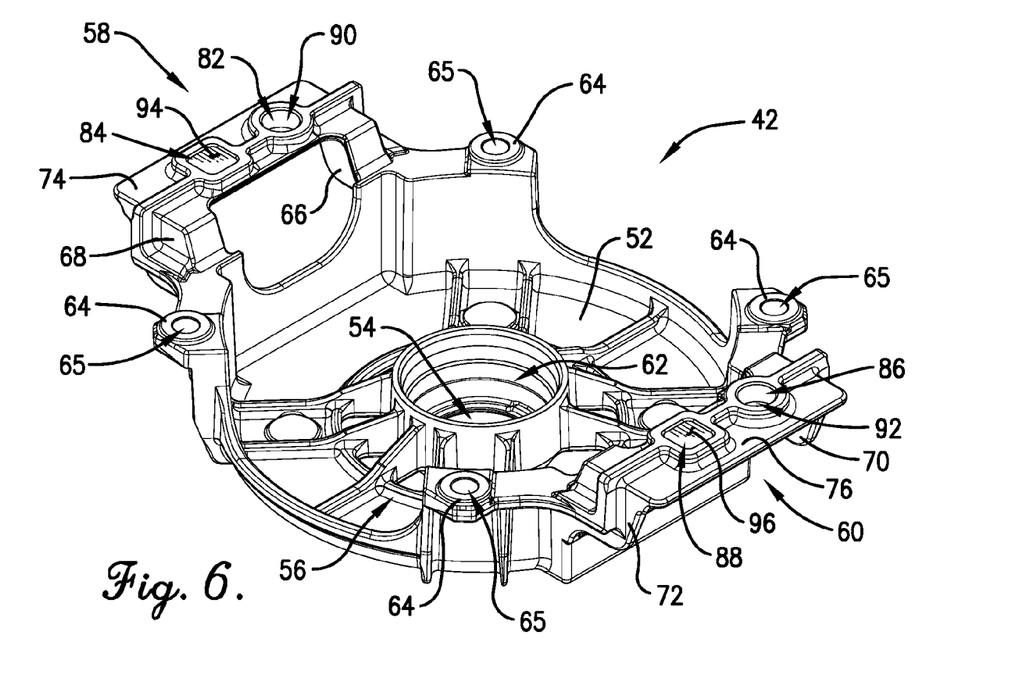
FIG. 6 is an isometric view of the endshield of FIG. 5, shown from another vantage point, depicting another side of the endshield and illustrating both of the mounting flanges, each presenting the pair of dissimilarly-shaped recesses, one of each of which extends through the flange to cooperatively define a single set of like-shaped holes.

With continued reference to FIG. 3, and attention also to FIGS. 5 and 6, it will be readily appreciated by one of ordinary skill in the art that the endshield 42 is substantially symmetrical with respect to the center line 102, with the exception of the dissimilarly-shaped recesses 82, 84, 86, 88. Furthermore, one of ordinary skill in the art may observe that the endshield 42 is substantially symmetrical with respect to a transverse center line 108, even including the dissimilarly-shaped recesses 82, 84, 86, 88.

A method of manufacturing components for electric motor assemblies (such as motor assembly 20) configured to be mounted within respective machines in a selected one of multiple possible motor dispositions corresponding with different motor axis positions should be apparent to one of ordinary skill in the art from the foregoing and, therefore, will be described here only briefly. Due in part to the extensive symmetry of the endshield 42, a plurality of such endshields may be formed by casting with a single die-cast die to form the plurality of dissimilarly-shaped recesses 82, 84, 86, 88. Upon initial casting, each of the dissimilarly-shaped recesses 82, 84, 86, 88 includes material flashing (such as flashing 94) extending thereacross.

A first subset of endshields 42 may be produced by removing the material flashing from a first pair of like-shaped recesses 82, 86 to produce endshields 42 that each present a first set of like-shaped through holes 90, 92 for use with a first subset of motor assemblies. A second subset of endshields may be similarly produced by instead removing the material flashing from a the second pair of like-shaped recesses 84', 88' to produce endshields that each present a second set of like-shaped through holes 90', 92' for use with a second subset of motor assemblies. Of course, in the alternative arrangement shown in FIGS. 9 and 10, the material flashing 94' is maintained in the recesses 82' and 86' so that only the single pair of alternative through holes 90', 92' are presented. The removal of the material flashing from either the first pair of like-shaped recesses 82, 86 or the second pair of like-shaped recesses 84, 88 may be performed with a selected trim die, such that first and second subsets of endshields are selectively formed depending upon the selected trim die used.

Upon formation of the first and second subsets of endshields, one of the first subset of endshields 42 may be secured to an axial margin of a corresponding first motor portion (e.g., portion 30 or a shell) such that fastening the first assembly through the first pair of like-shaped through holes 90, 92 will dispose the first motor in a first disposition and position the axis of the motor in a first position within the machine. Similarly, one of the second subset of endshields may then be secured to an axial margin of a corresponding second motor portion (e.g., portion 30 or a shell) such that fastening the second assembly to the second pair of like-shaped through holes will dispose the second motor in a second disposition and position the axis of the motor in a second position within the machine. With reference made to the relative offset dispositions illustrated by the lateral offset of the first set of recesses 82, 86 relative to the second set of recesses 84, 88 (as shown in FIG. 3), the first position within the machine and the second position within the machine will be laterally offset from one another.

The lateral offset between the first position and the second position within the machine will result in different motor axis positions, such that the tension of a belt wrapped around a sheave disposed on the shaft of the motor (or other design parameters) will be different between the first position and the second position. The presentation of dissimilarly-shaped recesses 82, 84, 86, 88 in the mounting flanges 58, 60 and the definition of only one of the sets of recesses as through holes (formed from either the pair 82, 86 or 84, 88) provides for an association to be made between a given set of like-shaped holes and a corresponding position of the motor. Such an association may provide for expedited production of a motor assembly within a corresponding machine having a designated motor axis position, while preventing improper production of an alternate motor axis position. The ability to form a plurality of endshields using a single die-cast die also provides advantageous time and cost savings in the production of endshields for various motor assemblies.

The preferred forms of the invention described above are to be used as illustration only, and should not be utilized in a limiting sense in interpreting the scope of the present invention. Obvious modifications to the exemplary embodiments, as hereinabove set forth, could be readily made by those skilled in the art without departing from the spirit of the present invention.

The inventors hereby state their intent to rely on the Doctrine of Equivalents to determine and access the reasonably fair scope of the present invention as pertains to any apparatus not materially departing from but outside the literal scope of the invention set forth in the following claims.

What is claimed is:

1. An electric motor assembly configured to be mounted within a machine in a selected one of multiple possible motor dispositions corresponding with different motor axis positions, said assembly comprising:
a rotor assembly rotatable about the axis;
a stator assembly spaced radially from the rotor assembly; and
motor mounting structure that presents at least one engagement portion configured to at least partly engage corresponding machine mounting structure within the machine,
each engagement portion including a plurality of spaced apart, dissimilarly-shaped recesses that extend in a generally common direction, with each recess being associated with one of the motor dispositions,
only one of said recesses extending entirely through each engagement portion to define a single fastener-receiving through hole corresponding to the selected motor disposition.

2. The electric motor assembly as claimed in claim 1, each engagement portion being generally planar and substantially orthogonal to the axis.

3. The electric motor assembly as claimed in claim 1,
said stator assembly presenting opposite axial margins,
said motor mounting structure comprising an endshield adjacent one of the axial margins.

4. The electric motor assembly as claimed in claim 3,
said endshield including a pair of opposite generally radially-extending mounting flanges that each present a respective engagement portion, with each engagement portion including the plurality of spaced apart, dissimilarly-shaped recesses,
said pair of flanges cooperatively presenting corresponding sets of like-shaped recesses, with each of the sets of recesses being associated with one of the motor dispositions,
only one of said sets of recesses extending entirely through the engagement portions to define a single set of like-shaped through holes corresponding to the selected motor disposition.

5. The electric motor assembly as claimed in claim 4,
said stator assembly further presenting a radially outer portion spaced away from and housing at least a portion of the rotor assembly,
said endshield further including a plurality of generally radially-extending assembly flanges, with each assembly flange including an assembly hole defined therethrough configured to receive fasteners for securing the endshield to the radially outer portion of the stator assembly,
said assembly flanges being axially offset from said mounting flanges.

6. The electric motor assembly as claimed in claim 4,
each of said dissimilarly-shaped recesses presenting a substantially equal minimum distance dimension thereacross.

7. The electric motor assembly as claimed in claim 4,
each engagement portion including exactly one pair of dissimilarly-shaped recesses extending in the axial direction.

8. The electric motor assembly as claimed in claim 7,
said pair of dissimilarly-shaped recesses including one circular recess and one noncircular recess.

9. The electric motor assembly as claimed in claim 4,
said endshield defining a radially-extending center line passing through an approximate midpoint of each of the mounting flanges,
at least one recess of each set of like-shaped recesses being at least substantially disposed on one side of the center line, and at least one recess of another set of like-shaped recesses being at least substantially disposed on the other side of the center line.

10. The electric motor assembly as claimed in claim 9,
said endshield being substantially symmetrical with respect to the center line except for the dissimilarly-shaped recesses.

11. The electric motor assembly as claimed in claim 10,
each engagement portion including exactly one pair of dissimilarly-shaped recesses,
said pair of dissimilarly-shaped recesses including one circular recess and one noncircular recess,
said circular recess being at least substantially disposed on one side of the center line and said noncircular recess being at least substantially disposed on the other side of the center line.

12. An endshield configured to least partially cover an axial margin of an electric motor assembly and also configured to provide a mounting connection between the motor assembly and corresponding mounting structure within a machine into which the motor assembly is to be mounted in a selected one of multiple motor dispositions corresponding with different motor axis positions, said endshield comprising:
a body operably secureable to the axial margin of the motor assembly,
said body including a pair of opposite generally radially-extending mounting flanges,
each mounting flange presenting an engagement portion configured to at least partly engage the corresponding mounting structure of the machine,
each engagement portion including a plurality of spaced apart, dissimilarly-shaped fastener-receiving recesses that extend in a generally common direction and are configured to alternately receive a fastener therein,
said pair of flanges cooperatively presenting corresponding sets of like-shaped recesses, with each of the sets of recesses being associated with one of the motor dispositions,
only one of said sets of recesses extending entirely through the engagement portions to define a single set of like-shaped through holes corresponding to the selected motor disposition.

13. The endshield as claimed in claim 12,
said body defining a radially-extending center line passing through an approximate midpoint of each of the mounting flanges,
at least one recess of each set of like-shaped recesses being at least substantially disposed on each side of the center line, and at least one recess of another set of like-shaped recesses being at least substantially disposed on the other side of the center line, said body being substantially symmetrical with respect to the center line except for the dissimilarly-shaped recesses.

14. The endshield as claimed in claim 12,
said body further including a plurality of generally radially-extending assembly flanges configured to facilitate securement of the body to the motor assembly, with each assembly flange including an assembly hole defined therethrough configured for receiving fasteners for securing the body to the motor assembly,
said assembly flanges being axially offset from said mounting flanges.

* * * * *